United States Patent [19]

Ruff

[11] 4,036,998

[45] July 19, 1977

[54] HONEY CONTAINING DESSERT COMPOSITION

[75] Inventor: John Ruff, Banbury, England

[73] Assignee: General Foods Limited, Oxon, England

[21] Appl. No.: 650,830

[22] Filed: Jan. 21, 1976

[30] Foreign Application Priority Data

Jan. 31, 1975 United Kingdom .................. 3739/75

[51] Int. Cl.² ............................................. A23L 1/187
[52] U.S. Cl. ...................................... 426/302; 426/573
[58] Field of Search ................. 426/96, 293, 302, 573, 426/575, 576, 578, 658, 620, 579

[56] References Cited

U.S. PATENT DOCUMENTS

| 3,244,528 | 4/1966 | Torr .................................. 426/658 X |
| 3,914,456 | 10/1975 | Norsby et al. ........................ 426/579 |
| 3,934,049 | 1/1976 | Lauck .............................. 426/579 X |

*Primary Examiner*—Raymond N. Jones
*Assistant Examiner*—R. A. Yoncoskie
*Attorney, Agent, or Firm*—Bruno P. Struzzi; Howard J. Newby; Mitchell D. Bittman

[57] ABSTRACT

Free-flowing powder dessert compositions containing up to as much as 15% by weight of natural liquid honey uniformly distributed throughout the compositions.

5 Claims, No Drawings

1

HONEY CONTAINING DESSERT COMPOSITION

BACKGROUND OF THE INVENTION

1. Field of the Invention

This invention relates to dessert compositions, and more particularly to free-flowing instant dessert powders which contain real liquid honey, and to the preparation thereof.

2. Description of the Prior Art

Heretofore, numerous kinds of instant dessert compositions have been formulated and placed on the market. Such prior compositions in dry powder form normally have sucrose or other sugars, pregelatinized starch and spray-dried fat emulsions as main ingredients, and they normally are adapted to be made up by the housewife by adding milk, and often whisking the mixture by a beating action to incorporate air. The composition may also include various setting agents, such as phosphates which act on milk, and various natural or artificial flavoring material and colors may also be included. Such made-up products have been highly popular.

The favorable organoleptic qualities of natural honey are well known and, accordingly, there is a strong motivation for including the total flavor and all other desirable characteristics of honey into instant dessert compositions. However, prior to the present invention, the incorporation of honey into instant dessert compositions so that all original and natural characteristics of the honey are retained has not been satisfactorily accomplished. Various dried honeys are available, some commercially, such as for example by spray-drying, foam-mat drying, or vacuum-drying, when in most cases, various adjuncts such as cornsyrup solids are encapsulating gums are added to facilitate the drying. Such adjuncts, however, may not be desired as constituents of the finished products. Without adjuncts, dried honeys can be difficult to prepare. Such products have been particularly recommended for use in products for subsequent baking. They do not, nor need not, however, retain all the natural flavoring principles of the original honey, which reside in certain volatile compounds, according to source. Freeze-dried honeys, again with or without drying adjuncts may be prepared, but may also suffer from their rather hygroscopic properties, making difficulty in subsequent handling, and lack of some of the original flavoring principles. A further property of natural honey is its diastatic activity due to the presence of a natural enzyme, diastase, which is lost by processing methods which involve removal of water by heating. Compositions in which dried honeys have been mixed into powder compositions may provide instant desserts, but, for the reasons given, these prior compositions do not provide the desired honey flavor, nor contain all the elements of real honey.

SUMMARY OF THE INVENTION

It has been found that real or natural honey from variour natural sources may be incorporated into instant dessert compositions, without loss of their natural flavor and other characteristics. This may be achieved by spraying a liquid honey on an agitated or fluidized bed of the dessert powder composition in such a way that the droplets of honey are readily taken up and mixed uniformly throughout the composition. There are a number of problems which are associated with this operation. The composition of the honey is variable from one type to another, but an accepted specification is that given in the European Economic Community (EEC) directive for honey published on the Aug. 12, 1974.

An annex to the directive contains some compositional criteria for honey, of direct concern.

|  | Blossom Honey | Honeydew Honey Blends of Honeydew and Blossom Honey |
|---|---|---|
| Apparent reducing Sugar content, calculated as invert sugar (minimum) | 65% | 60% |
| Apparent sucrose content (maximum) | 5% | 10% |
| Moisture content (maximum) | in general, 21% |  |

The diastase activity measured on the Schade Seale has in general to be not less than 8 units. In addition, natural honey may be distinguished according to its form, i.e., comb, chunk, drained, extracted or pressed honey, when some form of heat processing may be necessary to prepare the honey, through the natural enzymes are not to be substantially destroyed. This invention is concerned with a process and composition using a liquid honey.

DESCRIPTION OF THE PREFERRED EMBODIMENTS

In accordance with the present invention there is provided a free-flowing powder dessert composition which comprises a dessert powder formulation containing one or more carbohydrates, a gelling or setting agent and optional amounts of edible fat, emulsifier and stabilizer and, having incorporated therein natural liquid honey which retains the aromatic and diastatic elements constituting real honey, as hereinafter described.

It is difficult to define precisely the aromatic qualities of a honey in quantitative terms, since little work on this subject has been reported in the literature but some qualities, apart from basic compositional standards, are known to be important to the consumer. Analysis by gas-liquid chromatography reported in Lebensmittel (1973), p. 225, for example, has identified citronellol, geraniol as constituents, amongst many others. Different batches of ostensibly the same commercial honey-type may have slightly different aromatic and taste characteristics. There are therefore two important characteristics of real honey; (1) The type and quantity of flavoring components and (2) The diastatic activity. In respect of the latter, a honey with a zero or negligible diastatic activity can no longer be regarded as a real honey, except in a few limited cases, as also described in the Directive. Diastase activity of a honey, even if marginally present, is however readily lost by heat processing, thus for example, heating to 100° C for 30 minutes may reduce an initial value of 16 to zero. Flavoring components have a so-called 'head-space' aroma, which may be assessed by the nose, or by modern gas-liquid chromatography (GLC) techniques. GLC may also be performed on the essential oil of honey, prepared by steam distillation or solvent extraction. Headspace aroma may be assessed by withdrawing a small sample of the headspace air above the honey contained in a closed container. The sample may then be injected into the GLC apparatus for its resolution. These two important groups of substances (diastatic and aromatic) must therefore be substantially retained in order that the honey incorporated in a dessert may be said to be real honey. A dried honey admixed in a dessert composition cannot be said to have this essential and real quality. Freeze-dried honeys will have the nearest approach, for example, they may retain the diastatic activity of the original honey, but cannot be equal to honey which has been directly and physically incorporated into the dessert composition. Liquid honey is, however, a very viscous liquid, as illustrated by the following typical data, 150 centiposes at 60° C and 30 poises at 25° C. However, it may be satisfactorily sprayed to generate fine globules of less than 300 microns, average diameter by means of a twin fluid pneumatic nozzle of appropriate size, which spray may be incorporated uniformly into an agitated bed of the powder composition.

Accordingly, the invention also provides a process for producing a free-flowing powder dessert composition containing real honey, which comprises pumping liquid honey, heated to reduce its viscosity, through a spray nozzle to produce a spray of liquid honey globules having an average diameter of less than 300 microns on to a dessert composition as herein described.

In order to maintain a reasonable viscosity for spraying, the liquid honey which is pumped to the spray nozzle is passed through a suitable exchanger or other heating device to heat up rapidly to not more than 60° C within a short time, when the aforementioned qualities of the honey are not impaired. Other methods of spraying may be used, which generate a similar range of globule size. The agitated bed may be provided in a number of ways, which simultaneously comprise a mixing action. Spraying upon an agitated fluidized bed or upon a rising or falling curtain of the base powder are acceptable method of incorporation of real honey according to this invention. An agitated bed is especially convenient since it enables the other dry components of the mix to be first mixed together in the same equipment.

A preferred process according to this invention comprises the use of a twin-fluid pneumatic nozzle generating globules of less than 100 microns average diameter, to which is pumped through a heat exchanger, a liquid honey which conforms to the specification of genuine honey, and has then a viscosity of not more than 200cp. The spray of liquid honey is directed downwardly upon a dessert composition, of a sugar-based type which is inherently free-flowing and has the capacity to absorb the small amount of water in the honey without physical change to the product, which composition is kept agitated by mixing in a blender of the trough type with helical blades. The composition during mixing should be kept slightly above the blades of the mixer, and the spray positioned a short distance above the powder surface. The quantity of honey used in relation to the weight of the dessert composition should be not more than 15% and preferably 4% to 6%. The spraying time preferably should be arranged to be between 5 and 20 minutes. The precise arrangement of the nozzle and its position is not critical except that the spray should be of relatively fine globules less than 300 microns average diameter and such that it does not contact any metal surfaces, and be uniformly incorporated into the powder mix.

Also the nature of dessert compositions to which the honey is applied is not critical, except that it should be substantially free-flowing. The base composition may typically comprise sucrose or other sugars, corn syrup solids, pregelatinized starch, spray-dried fatty emulsions, gelatine powders, alginates and carageenans, and mild-coagulating salts, in any desired proportion. The taste of honey in the final product will be more evident when applied to a bland-flavored mix, but so long as the natural honey flavor is retained without change in the final product, other flavoring materials may be incorporated.

The product produced by the process of this invention possesses the qualities of real honey, in that the flavoring components and diastatic activity are essentially retained. The process is convenient to carry out, in that the problems associated with the handling and blending of hygroscopic dried honeys are avoided. A process of simple blending of dried honeys does not lead to the composition of this invention, since all the original qualities of real honey are not finally present.

The following Example illustrates the invention and the manner in which it may be performed.

EXAMPLE

Two kgs. of a liquid honey, conforming with the EEC directive for a natural honey, and having a diastatic activity of 16 Schade units, and a distinctive headspace aroma, were sprayed onto an instant dessert composition weighing 45 kg. contained in a trough mixer fitted with helical blades. The formulation of this composition, by weight, is as follows:

| | |
|---|---|
| Sucrose | 72% |
| Pregelatinized Starch | 17% |
| Spray-dried Vegetable Fat Emulsion | 7% |
| Disodium hydrogen phosphate and tetra sodium pyrophosphate | 4% |
| Fruit flavoring and coloring | to taste |

The capacity of the mixer was such that with the blades rotating at 65 rpm, the level of the powder was just above the blades. A twin-fluid pneumatic nozzle device, (Spray System Inc., catalog No. 29) was mounted above the mixer, with the nozzle head some 15 cm above the surface of the powder. The flow rate of the honey was adjusted to 0.3 kg/minute, with a pressure of 3.5 kg/m$^3$. The honey had been heated to 60° C immediately before spraying, the air pressure was adjusted to 3.5/m$^3$ to give a spray on the surface of the powder which was estimated to be 15 cm in diameter, whereas the width of the mixer was 91 cm. The honey taken from the spray had a diastatic activity of 15 Schade units, and retained the same headspace aroma. The resulting product was found to be free flowing, with the honey uniformly incorporated as separate fine particles, and had a distinctive natural honey taste.

What is claimed is:

1. A process for producing a free-flowing powder dessert composition containing real honey which comprises spraying liquid honey globules having an average diameter of less than 300 microns on to an agitating free-flowing powder dessert composition.

2. The process of claim 1 wherein the real honey is sprayed upon an agitated fluidized bed of dessert composition.

3. The process of claim 1 wherein the real honey is sprayed upon a falling curtain of the dessert composition.

4. The product produced by the process of claim 1 wherein the honey substantially retains the aromatic and diastic elements constituting real honey.

5. The product of claim 4 wherein the real honey content is 4% - 6% by weight of the composition.

* * * * *